March 12, 1968   B. BURSON, JR   3,372,440
GUARDIAN SAFETY BELT BUCKLE
Filed Dec. 23, 1965
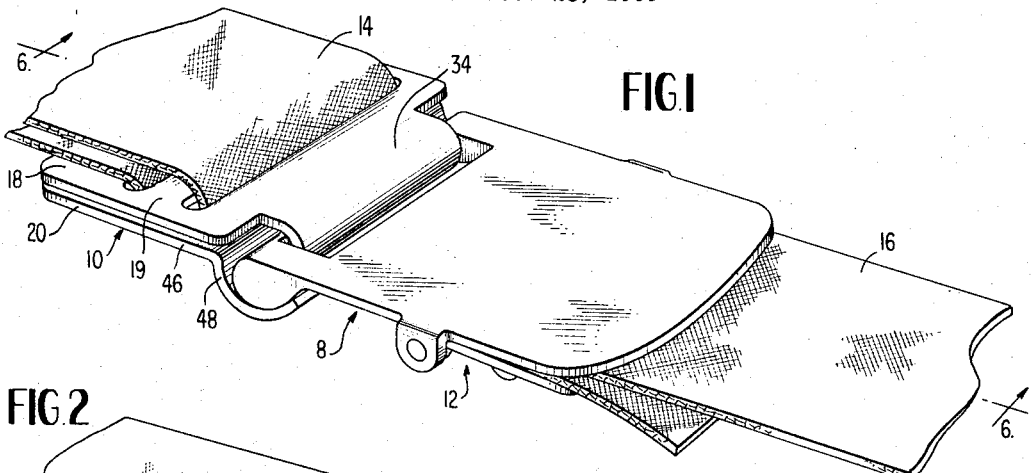
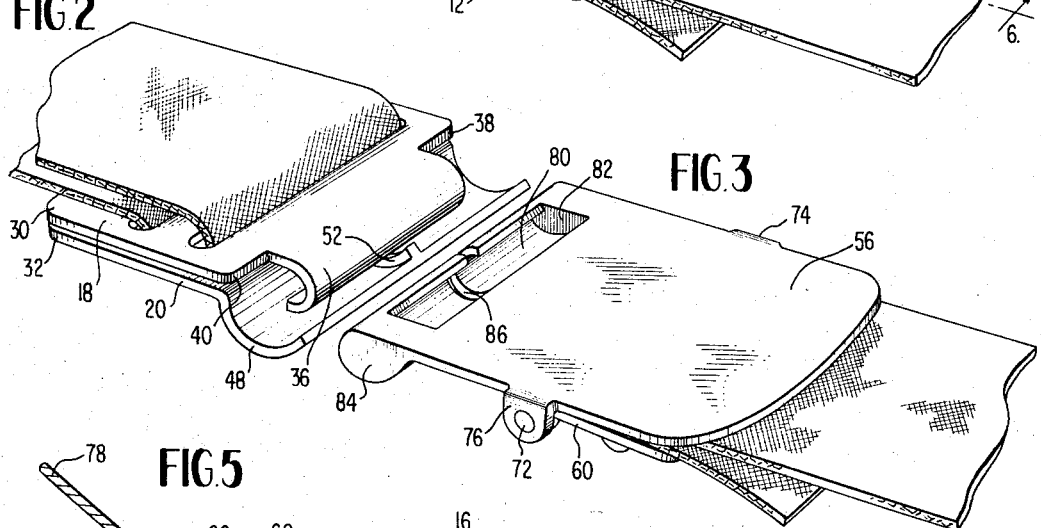
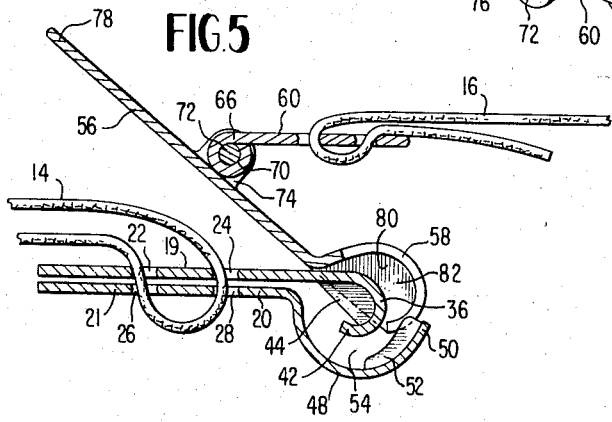
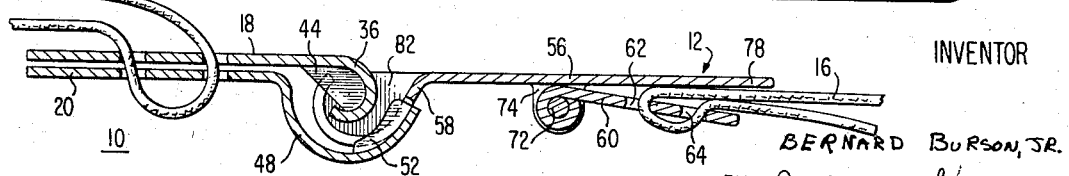
INVENTOR
BERNARD BURSON, JR.
BY LeBlanc + Shur
ATTORNEYS United States Patent Office 3,372,440
Patented Mar. 12, 1968

3,372,440
GUARDIAN SAFETY BELT BUCKLE
Bernard Burson, Jr., Austin, Tex., assignor of sixty-six and two-thirds percent to Perry S. Brown, Austin, Tex.
Filed Dec. 23, 1965, Ser. No. 515,831
12 Claims. (Cl. 24—75)

ABSTRACT OF THE DISCLOSURE

There is disclosed herein a safety apparatus for use in automobiles, aircraft, or the like, having a pair of safety belt portions and a belt buckle arrangement having dissimilar buckle sections attached to the safety belts. A first buckle section is formed of a pair of opposed curved members arranged to define a cavity and to receive a complementary curved portion of the second buckle section. The apparatus is assembled by pivoting the second buckle section around one of the curved portions of the first buckle section to insert it into the cavity. Metal-to-metal contact of the buckle sections provides positive locking and prevents accidental disassembly. Retaining means in the form of side plates and/or a keyway and rib arrangement prevents lateral movement of the parts during use.

This invention relates to safety belt apparatus and more particularly to belt buckles for use with safety belts for aircraft or automobiles, and the like, which may be more economically constructed and more easily and safely used than those previously available.

The use of safety belts or straps in all types of passenger carrying vehicles is becoming extremely widespread because of the recognition thereof as a safety factor. For example, it has been proved that the use of safety belts alone would prevent the greater portion of deaths caused by automobile accidents and would reduce by one-third the number of serious injuries.

In order to provide adequate protection for the wearer, the belts, buckles, and other fittings must be of sufficient strength to withstand the stresses placed upon them in a collision, and should provide metal to metal contact between the separable parts. Further, the device should be designed to permit rapid and simple fastening since there would be a tendency not to use the device if its attachment was either complicated or time-consuming. In addition, the device should be designed so as to minimize the possibility that it will appear to be properly fastened while in fact not being so.

Many of the present safety belt buckle designs do not provide all of the above-mentioned desirable features. Generally, those presently available devices which do provide the above-mentioned features often include a number of other undesirable features. For example, many of the available seat belt constructions employ a multitude of small, though very important parts, such as wedges, ratchets, and springs, or combinations thereof. Such elements are easily dislodged or broken, and, in addition, result in a high manufacturing cost for the article.

Other seat belts employ magnets as part of the locking device, which may result in the magnetization of nearby watches or clocks.

In contrast, the safety belt of the present invention utilizes a buckle construction having a first section including a pair of curved elements, and a second section including a further complementary curved element. Fastening of the safety belt of this invention merely requires the insertion of the third element into a cavity defined by the first and second curved elements. This engagement provides a simple and convenient latching structure which considerably reduces the possibility of accidental release.

Accordingly, it is an object of this invention to provide an improved buckle for aircraft or automobile safety belts.

It is a further object of this invention to provide an improved safety belt buckle which can quickly and easily be engaged and released.

It is also an object of this invention to provide a buckle as described above in which the possibility of accidental release is minimized.

It is a further object of this invention to provide a safety belt buckle which is inexpensive to manufacture.

It is an additional object of this invention to provide an inexpensive safety belt buckle having a minimum number of parts and employing no small elements, such as springs or ratchets or combinations thereof.

It is also an object of this invention to provide a safety belt buckle as described above, which does not employ magnets in the locking structure.

Another object of this invention is to provide a safety belt utilizing the novel buckle construction described above.

It is also an object of this invention to provide a safety belt including the above-described buckle construction which may be quickly and easily fastened and unfastened.

It is an additional object of this invention to provide a safety belt having the novel buckle described above in which the possibility of improper fastening or accidental release is minimized.

It is a further object of this invention to provide a safety belt buckle employing a pair of curved elements adapted to receive therebetween a further curved element constituting the locking structure for the buckle.

It is an additional object of this invention to provide a safety belt buckle construction as described above, including a first portion having a pair of curved elements and a second portion having a third curved element adapted to be received between the pair of curved elements in the first section.

It is also an object of this invention to provide a safety belt buckle as described above including guiding and reinforcing means to permit rapid and easy fastening and to minimize relative motion between the parts.

A further object of this invention is to provide a safety belt construction in which the buckle comprises a first portion having a pair of curved elements of unequal curvature and a second curved portion adapted to be received between the first and second curved elements.

The exact nature of this invention, as well as other objects and features thereof, will be clear from consideration of the following specification and the annexed drawings, in which:

FIGURE 1 is a perspective view of the novel belt buckle of the present invention, shown in the latched position, and attached to the safety belt;

FIGURE 2 is a perspective view of the first and second elements of the buckle;

FIGURE 3 is a perspective view of the third element of the buckle;

FIGURE 4 is a top plan view of a portion of the structure shown in FIGURE 3, showing the means by which the third element is attached to the safety belt;

FIGURE 5 is a sectional view taken along line 6—6 in FIGURE 1 showing the three elements in position immediately prior to being coupled, or in the process of being released; and FIGURE 6 is a sectional view similar to FIGURE 5 showing the three elements of the buckle in their coupled position.

Referring now to the drawings, the safety belt and buckle arrangement of this invention, generally indicated at 8 in FIGURE 1, comprises a pair of interlocking sections 10 and 12 suitably attached to belt portions 14 and 16, respectively, of the seat belt. As shown, section 10 comprises first and second elements which may be a pair of plates 18 and 20 stamped out of heavy steel or similar metal. Plate 18 includes an extended portion 19 having a pair of transverse slots 22 and 24, and plate 20 includes a similar extended portion 21 having therein slots 26 and 28. The slotted portions 19 and 21 of plates 18 and 20 are generally flat and may include rounded or otherwise finished edges 30 and 32 at the ends thereof.

The other end 34 of plate 18 terminates in a downwardly curved tongue portion 36 preferably of slightly narrower width than the remainder of the plate, thereby defining a pair of shoulders 38 and 40 on opposite sides of the plate. The width of shoulders 38 and 40 is such as to permit a close-fitting engagement with a complementary portion of interlocking element 12, as explained below.

The lower end 42 of tongue 36 is bent so as to extend rearwardly below plate 18 toward shoulders 38 and 40 to form a retaining member for a portion of interlocking element 12.

As shown in FIGURE 5, tongue portion 36 may include a ribbed portion 44 suitably attached to the underside thereof to improve rigidity, and also to serve as a guide for a slot or keyway within interlocking element 12.

Plate 20 is generally similar to plate 18, except that the forward end 36 thereof terminates in a curved lip portion 48 which first bends downwardly from the plate and then upwardly again so the end 50 terminates slightly below the plane of slotted portion 19 of plate 18. Lip 48 preferably includes a ribbed portion 52, similar to rib 44 on tongue 36 to facilitate the engagement with interlocking element 12.

As may be seen in FIGURE 5, member 10 is assembled by abutting the two plates 18 and 20 with slots 22 and 26, and 24 and 28, in alignment, and by threading the portion 14 of the seat belt through each of the aligned pairs of slots. This permits both the adjustment of the belt length, and in addition, provides a convenient means of securing plates 18 and 20 in a fixed relationship.

Preferably, plates 18 and 20 are not connected in any other way, in order to permit some freedom of movement therebetween. However, in some instances, it may be desirable to additionally secure the plates, in which case, they may be attached together by spot welding, or the like.

The cross section of the curves of tongue 36 and lip 48 may be circular or of any other desired shape. However, in order to provide the locking arrangement of this invention, it is necessary that one of the elements, e.g., tongue 36, should have a tighter curve than the other. Thus, when member 10 is assembled, as described above, it may be seen that there is provided a cavity 54 defined by downwardly curving tongue 36 of plate 18 and upwardly curved lip portion 48 of the plate 20 due to the difference in the curvature therebetween.

The third element 12, which forms the interlocking portion of the buckle, comprises an upper plate 56 having a curved tongue portion 50 adapted for engagement within cavity 54 defined by tongue portion 36 and lip portion 48 of member 10.

In order to facilitate its entry into cavity 54, the curvature of tongue 58 should be equal to or tighter than that of lip 48. Also, to facilitate engagement of tongue 36 with the inner surface of tongue 58, the curvature of tongue 58 should be bounded by that of tongue 36. For example, if tongues 36 and 58, and lip 48 are of circular cross-section, then the radius of curvature of tongue 58 should be less than or equal to that of lip 48, and greater than or equal to that of tongue 36. Similar limitations should also apply to non-circular cross sections.

Element 12 further includes a second plate 60 for connecting element 12 to a second portion 16 of the belt. Plate 60 includes a pair of transverse slots 62 and 64 for threadedly receiving belt portion 16, and tongue portion 66 of slightly smaller width than the remainder of the plate. Tongue portion 66 includes an expanded end portion 68 having therethrough an aperture 70 for receiving a pin 72. The pin engages a pair of downwardly extending flanges 74 and 76 on upper plate 56, whereby the plates 56 and 60 are pivotally connected. The pivotal relationship between plates 56 and 60 facilitates the connection of the two interlocking sections 10 and 12 of the buckle. Upper plate 56 further includes a handle portion 78 at one end thereof by which the two plates may be pivoted. Alternatively, plate 60 may be dispensed with, and belt portion 16 directly attached to plate 56.

Curved portion 58 of plate 56 bends downwardly from the upper surface 78 of the plate and then curves upwardly to form a transversely disposed trough-shaped portion 80 at the end of the plate. The outer surface of tongue portion 50 is generally similar in shape to curved lip 48 on plate 20 but should be of slightly smaller curvature, as noted above, whereby upon insertion of the tongue portion 58 into cavity 54 between plates 18 and 20, the outer surface of tongue 36 enters into and is retained within the trough-shaped portion 80.

The side edges of tongue 58 are preferably covered by a pair of plates 82 and 84, formed integrally with plate 56 and tongue 58 or suitably attached after the plate has been formed. End plates 82 and 84 serve to guide sections 10 and 12 into proper relationship during the connection thereof, and to prevent lateral motion between the sections after the buckle is fastened. In addition, curved tongue portion 58 preferably includes a longitudinal slot 86 which serves as a keyway for receiving rib portions 44 and 52 on tongue 36, and lip 48, respectively.

As shown in FIGURES 5 and 6, fastening of the seat belt is accomplished by first positioning the two sections 10 and 12 of the buckle as shown in FIGURE 5, with plates 56 and 60 pivotally separated, and with tongues 36 and 58 adjacent to each other. Tongue 58 is then inserted between tongue 36 and lip 48 into cavity 54 guided by shoulders 38 and 40, ribs 44 and 52, and keyway 86.

As may be seen from FIGURE 6, there is then provided a tightly interlocked structure which cannot be separated without conscious effort by the user. Additional protection is provided by the action of threaded seat belt portions 14 and 16 which apply continuous tension between engaged tongues 36 and 58 especially when the belt portions are tightly secured around the wearer.

Removal of the seat belt may be readily accomplished by outwardly pivoting handle portion 78 and threading tongue 58 outwardly between tongue 36 and lip 48. Again, shoulders 38 and 40, ribs 44 and 52, and keyway 86 cooperate to assure rapid and convenient separation of the buckle sections.

It is thus seen that the present invention provides a simple and secure buckle for safety belts. There are no spring loaded parts, or magnets, and the simple principle of interlocking curves provides an excellent locking function. The connection is extremely strong and is also simple to accomplish. Since plates 56 and 60 will not lie in a substantially flat relationship as shown in FIGURE 6 unless the buckle is properly closed, incomplete closure is immediately evident. In addition, the buckle is simple and inexpensive to manufacture, and is completely compatible with presently used safety belts and fittings.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A belt buckle comprising first and second dissimilar interlocking sections; said first section including a first downwardly curved tongue portion and a curved lip portion having opposite and greater curvature then said first tongue portion, said portions curving toward each other to define a cavity with a transverse entry slot between said first tongue portion and the end of said lip portion; said second section including a further tongue portion having opposite curvature to that of said first tongue portion, the end thereof being freely insertable during assembly through said entry slot into said cavity and being engaged by the inner surface of said lip portion thereafter, the inner surface of said further tongue portion defining a trough for receiving the outer surface of said first tongue portion during insertion into said entry slot and for retaining said first tongue portion thereafter; limiting means on said first and second sections cooperating to prevent substantially all lateral movement between said sections; an means on each section for attaching portions of a belt thereto.

2. A belt buckle as defined in claim 1 wherein said limiting means includes rib means projecting from the inner surfaces of said first tongue and lip portions, and a keyway in said further tongue portion adapted to engage said rib means when the buckle portions are interconnected.

3. The belt buckle as defined in claim 1 where the curvature of the further tongue portion is at least equal to that of the first tongue portion.

4. The belt buckle of claim 3 where the curvature of the further tongue portion is at most equal to that of the lip portion.

5. The belt buckle as defined in claim 1 where the first section includes a first plate having thereon said curved tongue portion and a second plate having thereon said oppositely curved lip portion, the first and second plates each having therein a pair of transverse slots for threadedly receiving portions of a belt therethrough.

6. A belt buckle as defined in claim 5 where the first section includes rib means projecting from said first and second plates, and where the third plate includes a keyway adapted to engage the rib means when the buckle is assembled.

7. A belt buckle as defined in claim 6 where the second tongue portion includes upstanding wall portions defining opposite ends of said trough, and where the first tongue portion is laterally foreshortened to define shoulders engaging the wall portions when the buckle is assembled.

8. A safety apparatus comprising a belt buckle as defined in claim 5, a first belt portion threadedly received through said pairs of transverse slots, and a second belt portion pivotally attached to said second section.

9. A safety apparatus comprising first and second safety belt portions; a first buckle member attached to the first safety belt portion; a second buckle member attached to the second safety belt portion; the first buckle member including a pair of curved portions of different curvature and the second buckle member including a first plate having a further curved portion of curvature bounded by the curvature of the pair of curved portions of the first buckle member, the second buckle member being adapted for engagement between the curved portions of the first buckle member when the apparatus is assembled; a rib on the first buckle member positioned between the curved portions, a complementary keyway on the second buckle member adapted to engage the rib when the apparatus is assembled and a second plate pivotally attached to the first plate member and including means for securing the second safety belt portion thereto.

10. A belt buckle comprising first and second sections, said first section including a first plate having a downwardly curving portion and a second plate having an upwardly curving portion, said curving portions substantially facing each other, said first and second plates each having a pair of transverse slots for threadedly receiving portions of the belt therethrough, the second section including a third plate having thereon a downwardly-curved portion, and a fourth plate, pivotally attached to the third plate, having a further pair of transverse slots for threadedly receiving portions of the belt therethrough.

11. The belt buckle as defined in claim 10 where the second plate includes a ribbed portion thereon, and where the third plate includes a keyway adapted to engage the ribbed portion when the buckle is assembled.

12. The belt buckle as defined in claim 10 where the third plate includes upstanding end portions at the sides of the second curved portion to define therewith a trough extending transversely of the plate, and where the first plate includes shoulder portions at the sides of the first curved portion whereby it is adapted to fit within the trough when the buckle is assembled.

References Cited

UNITED STATES PATENTS

| | | | |
|---|---|---|---|
| 2,494,526 | 1/1950 | Tungett. | |
| 3,128,520 | 4/1964 | Carter | 24—242 |
| 569,213 | 10/1896 | Lehnig | 24—201 |
| 1,249,959 | 12/1917 | Hodges | 24—201 |
| 2,532,680 | 12/1950 | Snyder | 24—201 |
| 3,237,984 | 3/1966 | Schneider | 24—201 X |

FOREIGN PATENTS

| | | |
|---|---|---|
| 7,123 | 10/1901 | Austria. |
| 83,720 | 4/1921 | Austria. |
| 524,892 | 9/1921 | France. |
| 6,306 | 9/1894 | Sweden. |

BERNARD A. GELAK, *Primary Examiner.*